Jan. 16, 1962 J. K. NEWELL, JR 3,017,488
TENSION MOUNT FOR OVEN BREAKER FRAME
Filed Sept. 29, 1960 2 Sheets-Sheet 1
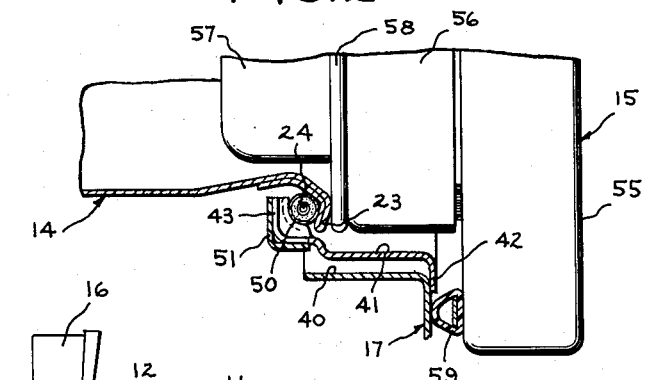
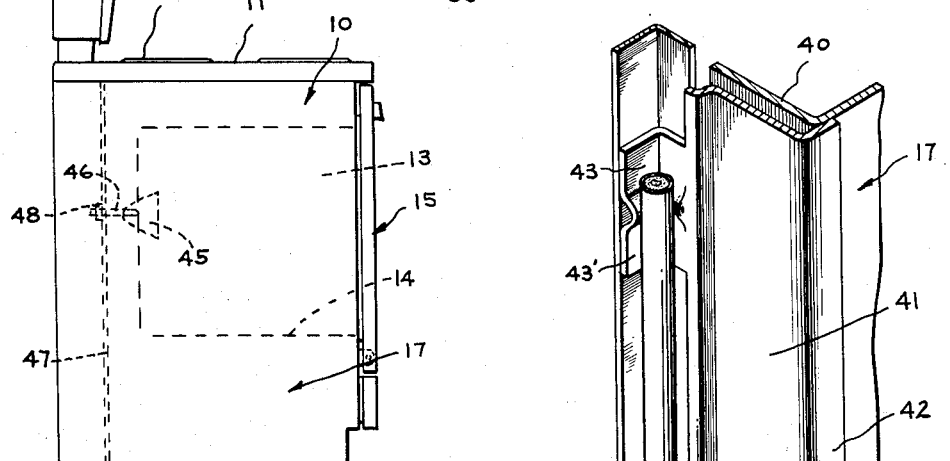
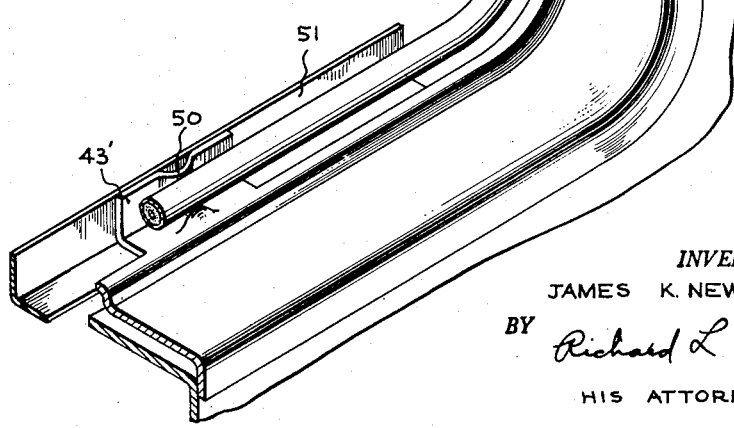
INVENTOR.
JAMES K. NEWELL JR.
BY Richard L. Caslin
HIS ATTORNEY Jan. 16, 1962    J. K. NEWELL, JR    3,017,488
TENSION MOUNT FOR OVEN BREAKER FRAME
Filed Sept. 29, 1960    2 Sheets-Sheet 2
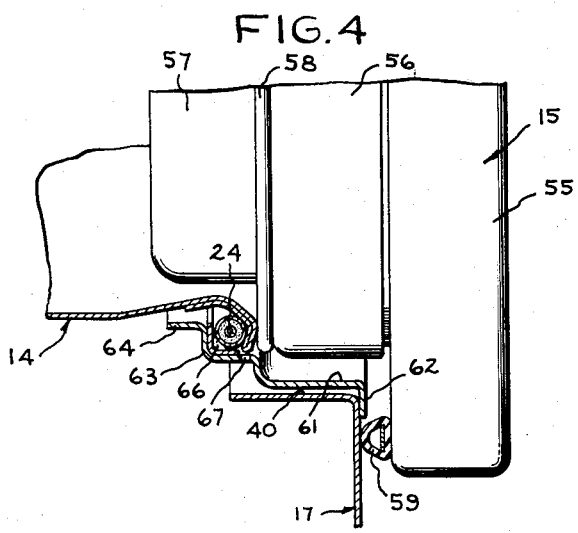
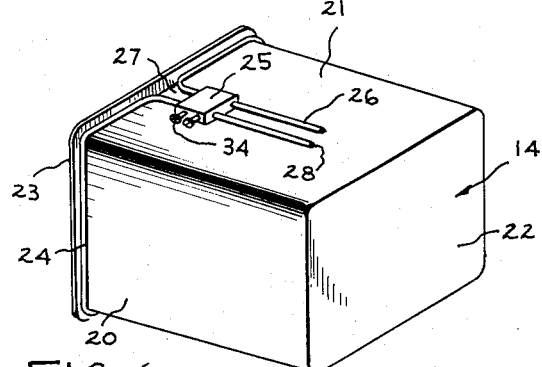
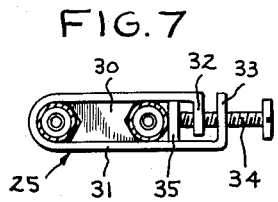
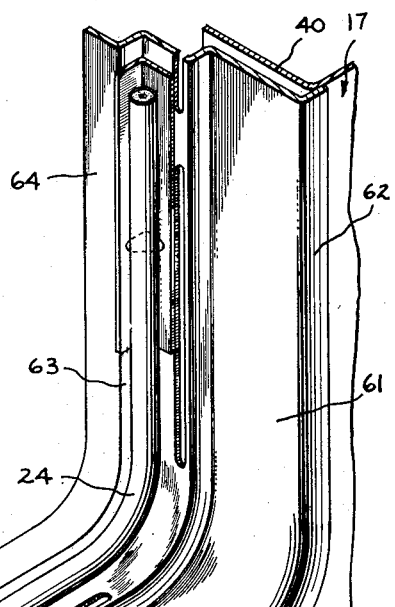
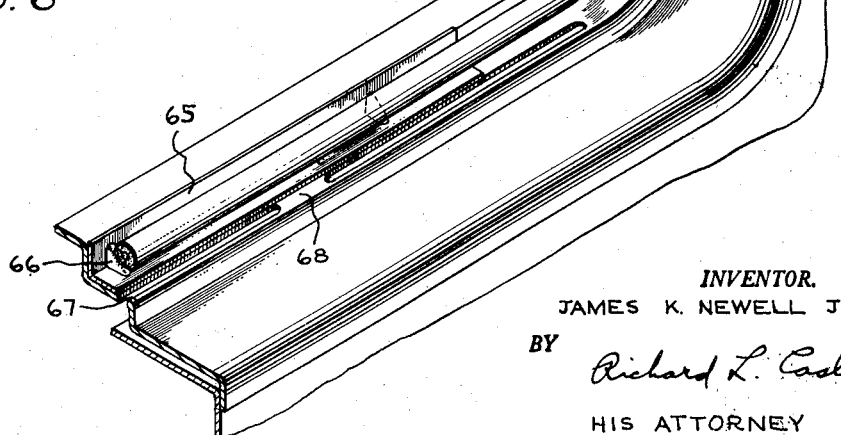
INVENTOR.
JAMES K. NEWELL JR.
BY
HIS ATTORNEY

United States Patent Office 3,017,488
Patented Jan. 16, 1962

3,017,488
TENSION MOUNT FOR OVEN BREAKER FRAME
James K. Newell, Jr., Louisville, Ky., assignor to General Electric Company, a corporation of New York
Filed Sept. 29, 1960, Ser. No. 59,434
13 Claims. (Cl. 219—37)

The present invention relates to ovens of domestic ranges and particularly to a means of mounting and isolating the oven liner in a range body, and a means for positioning and holding a heating unit that contributes heat to the oven front, all so as to reduce the heat loss between the front of the oven liner, the oven door, and the range body.

This invention is related to the art of automatic heat cleaning of the inner walls of the oven liner where the temperature within the oven cavity is raised to the vicinity of 750° F.–950° F. which is about 200°–400° higher than the normal maximum cooking temperature as is taught in the copending application of Bohdan Hurko, Serial No. 27,926 filed May 9, 1960, and assigned to the General Electric Company, the assignee of the present invention. The purpose of the extremely high temperature is to burn off food particles and grease spatter that naturally accumulate on the oven liner. In such a heat cleaning operation all of the walls of the oven liner should be heated uniformly to the heat cleaning temperature; because, if the temperature drops appreciably around any areas, as at the oven door, due to heat loss from the oven then all of the food soil in the cooled area will not be removed. The present invention represents a successful attempt of mounting the oven liner at a minimum of expense so as to virtually eliminate the heat loss around the oven door.

The principal object of the present invention is to provide an oven for a domestic range with a breaker frame for thermally isolating the oven liner from the front of the range body by using a simple tension means for supporting the front of the oven liner from the breaker frame.

A further object of the present invention is to provide a domestic oven with a breaker frame for thermally isolating the front of the oven liner from the range body by having reduced areas of contact therebetween while using tension means at the back of the oven for supporting the oven liner from the breaker frame.

A still further object of the present invention is to provide a domestic oven with a novel means for mounting the front of the oven liner in a breaker frame so as to thermally isolate the liner from the range body as well as to restrict the heat transfer through the breaker frame and redirect the heat energy back into the oven liner.

The present invention is incorporated in an oven which has controlled heating means capable of elevating the oven temperature to a level materially in excess of 600° F., in accordance with the disclosure of the aforementioned co-pending application of Bohdan Hurko. In the past, the standard method of supporting an oven liner in a range body has been to provide an outwardly directed flange around the open throat of the oven liner and utilize a pair of adjustable hooks extending through the back wall of the range body which would engage the back side of the oven liner and pull the liner into the body so that the flange would be braced tightly against the front wall of the body. If this standard mounting means were used in a heat cleaning oven there would be a temperature drop around the door of several hundred degrees so that it would be impossible to burn off the food soil in this relatively cool area.

The preferred embodiment of the present invention utilizes a breaker frame within the throat of the front opening in the range body and adjustable clamping means at the back of the oven liner for pulling the oven liner against the breaker frame thereby holding the breaker frame under tension. A mullion heater is wrapped around the periphery of the oven liner adjacent the front thereof and this heating element is interposed between the oven liner and breaker frame with reflector means being provided for redirecting the heat from the heating element back into the oven liner. There are reduced areas of contact between the breaker frame and heating element to further restrict the transfer of heat through the breaker frame and into the range body.

My invention will be better understood from the following description taken in connection with the accompanying drawings and its scope will be pointed out in the appended claims.

FIGURE 1 is a left side elevational view of a free-standing electric range embodying the present invention;

FIGURE 2 is a fragmentary cross-sectional plan view taken at the bottom left front corner of the oven and showing the cooperation between the oven liner, the breaker frame, the range body and the oven door;

FIGURE 3 is a fragmentary isometric view showing the breaker frame positioned in the front opening of the range body and the relative location of a metal sheathed mullion heating element with respect to the breaker frame;

FIGURE 4 is a cross-sectional plan view similar to that of FIGURE 2 showing a second modification of this invention;

FIGURE 5 is a fragmentary isometric view similar to that of FIGURE 3 showing again the second modification of FIGURE 4;

FIGURE 6 is an isometric view of the oven liner showing a metal sheathed heating element wrapped around the periphery of the front portion thereof and oven liner;

FIGURE 7 is a detail showing of the nature of the clamp of FIGURE 6 for supporting the metal sheathed heating element around the oven liner.

Turning now to a consideration of the drawings and in particular to FIGURE 1, there is shown a free-standing electric range 10 having a top cooking surface 11 with a plurality of surface heating elements 12, an oven cavity 13 formed by a box-like oven liner 14 and a front opening oven door 15. A backsplasher 16 is located along the back edge of the cooktop 11 for controlling the energization of the various heating elements of the range. The oven liner 14 is assembled in a range body or decorative cabinet 17 which supports the various components of the range and forms an attractive addition to the modern kitchen. While this invention has been incorporated in a free-standing electric range it is not limited to a free-standing range nor is it limited to an electric range. This invention could also be used in built-in wall ovens or counter-mounted ovens as well as in gas ranges without departing from the scope of this invention.

The oven liner 14 is best illustrated in FIGURE 6 where it is shown as a box-like structure having a bottom wall, parallel side walls 20, a top wall 21, a back wall 22 and an open front wall that is adapted to be closed by the oven door 15. The front edge of the oven liner has an outwardly extending annular lip or flange 23 which reinforces the front edge of the oven liner and assists in supporting the oven liner within the range body 17 as will be explained hereinafter. A preferred embodiment of this invention includes a mullion heater 24 in the form of a metal sheathed heating element which is looped around the periphery of the oven liner near the front thereof and directly behind the annular lip 23 for introducing heat energy to the oven liner adjacent the door opening and replenishing any heat lost through and around the door so that the wall temperatures of the oven cavity will remain more or less uniform.

An adjustable clamp 25 is assembled on the heating element 24 at the point 27 where the loop around the oven liner is completed. At this point the heating element is bent back across the top wall 21 of the oven liner towards the rear wall 22 to form parallel cold terminal portions 26. The actual heating portion of the element 24 terminates at the point 27 where the loop is closed. The parallel terminal ends 26 of the heating element are what is known in the art as cold terminals having an electrical termination at their free ends in the form of a male quick-connect blade or a screw terminal 28.

As seen in FIGURE 7 the adjustable clamp 25 first includes a separator block 30 for holding the two parallel cold terminals 26 apart so that they may not be forced into actual contact with each other. The clamp itself is formed in the nature of a yoke member 31 which is generally of U-shape and of compact size to slip over the cold terminals 26 of the sheathed heating element 24. The free ends of the yoke member are folded toward each other to form overlying tabs 32 and 33. Each such tab has a threaded opening that is aligned with the other opening for receiving a fastening screw 34. Actually there are two fastening screws 34 side by side as shown in FIGURE 6 for obtaining a strong clamping action. Point pressure of the end of the screws against the sheath of the heating element 24 must be avoided otherwise the sheath might be punctured and the underlying insulation damaged. This danger is alleviated by a pressure plate 35 interposed between the tips of the screws 34 and the sheath of the heating element 24. When this clamp 25 is applied to the cold terminals 26 its height is about the same as the lip 23 of the oven liner so that the clamp does not interfere with the ease of assembly of the oven liner into the range body.

The first modification of this invention is illustrated in detail in FIGURES 2 and 3. As seen in FIGURE 3, the range body 17 has a front opening 40 which is of generally rectangular shape for receiving the entire oven liner 14 therethrough. However, before the oven liner is assembled in the range body a breaker frame 41 is positioned within the throat of the opening. This frame 41 is formed from metal stock and has a generally Z-shape in cross-section as is best seen in FIGURE 2. The outermost edge of the frame has an outwardly directed flange 42 to bear against the edge of the body opening 40, while the innermost edge of the breaker frame has an inwardly directed flange 43 which is adapted to bear against the heating element 24 located behind the annular lip 23 of the oven liner. It is contemplated that the oven liner will be supported in the range body by a pulling force exerted against the back portion of the oven liner thereby compressing the heating element 24 between the annular lip 23 of the oven liner and the inwardly directed flange 43 of the breaker frame thereby applying tension to the breaker frame so that it is held rigidly in the opening 40 of the range body. This tension force is applied by a pair of adjustable hooks or clamps 45 that is located at the back of the oven liner as seen in FIGURE 1 and comprise threaded J-bolt members 46 which extend rearwardly through a back panel 47 of the range body and are tightened into place by suitable fastening nuts 48.

It is well to restrict the transfer of heat from the heating element 24 to the breaker frame 41. This may be done in several ways. In FIGURE 3, the innermost edge or flange 43 of the breaker frame 41 is in the form of a plurality of spaced fingers 43' which are widely separated from each other, there being about two such fingers on each side of the rectangular frame making eight fingers in all. Each finger has an inner embossment 50 which makes either a line contact or in some cases a point contact with the heating element to reduce the heat conduction through the breaker frame to the range body. These spaced fingers 43' are backed up by reflector strips 51 of aluminum or the like material to redirect the heat from the heating element back toward the oven liner. These reflectors may either be riveted or welded to the fingers. While FIGURE 3 shows the heating element 24 in place and the oven liner 14 is missing, it should be understood that this is only for illustrative purposes. The heating element is designed to be clamped first to the exterior of the oven liner and it is assembled in the range body when the oven liner is inserted through the front opening 40 of the range body.

The oven door 15 as shown in FIGURE 2 is of thick section having three elements namely, a decorative outer portion 55 which overlies the front opening 40 of the oven liner, a central portion 56 which extends into the breaker frame 41 but not into the oven liner 14, and an inner door liner 57 which does extend into the oven liner a good distance from the front of the range body. A thermal insulating gasket 58 of fiberglass or the like material is interposed between the inner door liner 57 and the central door portion 56 for insulating the two door portions from each other as well as for bearing against the annular lip 23 of the oven liner as is best seen in FIGURE 2. A second tubular gasket 59 of silicone rubber or the like material is mounted on the inner surface of the decorative outer portion 55 of the oven door and it bears against the edge of the range body 17 to seal the oven from the escape of smoke and odors that were not confined by the fiberglass gasket 58.

Turning now to a consideration of the second modification of this invention illustrated in FIGURES 4 and 5 of the drawing, elements that are identical with those of the first modification are identified by the same reference numerals. Everything is the same except for the substitution of a new breaker frame 61 having an outermost flange 62 turned out to bear against the edge of the body opening 40 while the innermost edge of the frame 63 is in the form of an inwardly directed step portion 63 against which the heating unit 24 may be braced. This step 63 is reinforced by an annular flange 64 that encircles the oven liner 14 for greater rigidity. Heat reflective surfaces in the form of aluminum strips 65 of generally L-shape in cross-section are seated in the steps along each side of the frame, and widely spaced embossments 66 are stamped on the innerside of the reflectors for a limited-area contact with the heating element 24 in a manner similar to the embossments 50 of the first embodiment of FIGURE 3. Elongated slots 67 are formed in the breaker frame within a plane that lies parallel and just in front of the heating element 24 for restricting the conduction of heat from the heating element 24 through the breaker frame 61 to the range body 17. These elongated slots 67 are separated from each other by narrow connecting strips 68.

Having described above my invention of a novel mounting and isolating means for an oven liner in a range body, it will be readily apparent to those skilled in this art that the primary advantage of this design is the action of the spaced fingers or embossments of the breaker frame in forming the metal sheathed heating element against the oven liner for improved heat transfer. This design has several beneficial results; namely, (1) it tends to hold the heater tightly against the oven liner by having a resultant force at any one point of the heater directed at a 45° angle with respect to the front opening of the oven liner and toward the center of the opening, (2) the strength of the breaker frame tends to straighten out any warping or bowing of the front portions of the oven walls and to mold or conform the oven liner and heater element for a better fit, and (3) the improved fit of the liner and heater element is increased by the tension forces exerted at the back of the liner.

The mullion heater is actually being used as a structural member in that it is in compression and resists the pull of the J-bolts at the rear of the oven liner. It is well to have the heating element very flexible so the fingers or embossments of the breaker frame would form the heater to the oven front for good metal to metal contact.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. An oven comprising an oven liner of box-like construction with a bottom wall, a pair of side walls, a top wall, a back wall, and a front opening for gaining access thereto, a range body surrounding the oven liner and including thermal insulation to insulate the liner from the body, the range body also having a front opening for receiving the oven liner therethrough, an oven door hinged to the front of the range body for closing the front opening of the oven liner, an outwardly extending annular lip formed on the oven liner near the front thereof, a metal sheathed heating element located around the oven liner just behind the annular lip for adding heat to the oven liner in this area, a metal breaker frame arranged within the throat of the front opening, the outermost edge of the breaker frame being turned out to bear against the edge of the body opening, the innermost edge of the breaker frame being turned inwardly to bear against the said heating element, and adjustable clamping means at the back of the range body for pulling against the oven liner thereby holding the breaker frame tensioned within the front opening of the range body while the heating element is compressed between the breaker frame and the lip of the oven liner for supporting the front end of the oven liner.

2. An oven as recited in claim 1 wherein reflector means are added to the innermost edge of the breaker frame for directing the heat energy of the heating element toward the oven liner.

3. An oven as recited in claim 2 wherein there are limited areas of contact between the inermost edge of the breaker frame and the heating element, and these areas of contact are widely spaced from each other to reduce the heat transfer from the heating element to the breaker frame so that most of the heat will be directed toward the oven liner.

4. An oven as recited in claim 3 wherein the innermost edge of the breaker frame is represented by a plurality of narrow fingers which are widely spaced from each other and have raised portions having limited areas of contact bearing against the heating element, said reflector means being represented by strips of reflector material fastened to the back surface of the plurality of fingers.

5. An oven as recited in claim 3 wherein elongated slots are formed in the breaker frame between the innermost edge and the outermost edge, and the slots lying generally in a plane that extends generally parallel to the heating unit, there being only slight connecting strips separating the elongated slots so that the slots serve to reduce the transfer of heat from the heating unit through the breaker frame to the front of the range body.

6. An oven comprising an oven liner of box-like construction supported in an oven body and being insulated therefrom by a thick blanket of thermal insulation, an outwardly directed annular lip formed on the oven liner near the front thereof, a metal sheathed heating element disposed on the oven liner just behind said lip for adding heat to the oven liner in this area, the oven body having a front opening for receiving the oven liner therethrough, a metal breaker frame positioned within the front opening of the oven body, and tension means at the back portion of the oven liner for holding the front of the oven liner positioned within the breaker frame so that the heating element serves as a structural member compressed between the breaker frame and the lip of the oven liner.

7. An oven as recited in claim 6 wherein there is a limited area of contact between the breaker frame and the heating element to reduce the heat transfer from the oven liner through the breaker frame and to the oven body.

8. An oven as recited in claim 9 wherein heat reflecting means are combined with the breaker frame for directing the heat energy of the heating element toward the oven liner.

9. An oven as recited in claim 7 wherein heat reflecting means are combined with the breaker frame for directing the heat energy of the heating element toward the oven liner.

10. An oven as recited in claim 6 wherein the innermost edge of the breaker frame is represented by a plurality of narrow fingers which are widely spaced from each other and have limited areas of contact with the heating element.

11. An oven as recited in claim 6 wherein the innermost edge of the breaker frame has a stepped construction where the heating element is seated in the step, there being a plurality of elongated slots formed in the breaker frame and lying in a plane in front of the heating element to reduce the heat transfer from the oven liner through the breaker frame and to the oven body.

12. An oven as recited in claim 11 wherein heat reflector strips are interposed between the step of the breaker frame and the heating element to direct the heat of the heating element toward the range body.

13. An oven as recited in claim 12 wherein the reflector strips include spaced embossments that have limited areas of contact with the heating element.

References Cited in the file of this patent

UNITED STATES PATENTS

| | | |
|---|---|---|
| 2,224,945 | Ames | Dec. 17, 1940 |
| 2,247,626 | Ames | July 1, 1941 |
| 2,415,768 | Shaw | Feb. 11, 1947 |